Oct. 13, 1936.  W. O. AMSLER  2,057,357
METHOD OF DRAWING GLASS SHEETS
Filed May 16, 1934  2 Sheets-Sheet 2

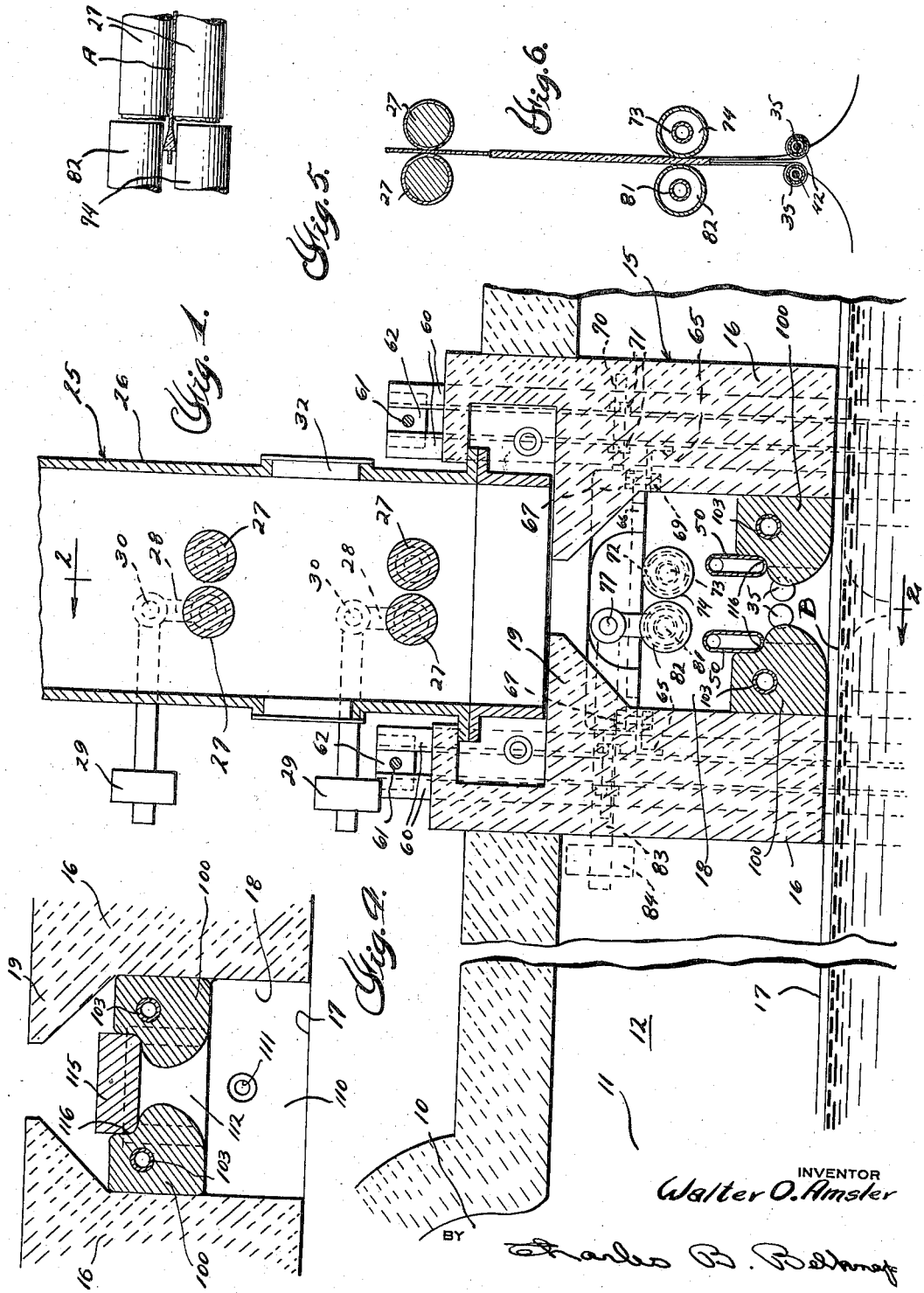

INVENTOR
Walter O. Amsler
BY
ATTORNEY

Patented Oct. 13, 1936

2,057,357

UNITED STATES PATENT OFFICE 2,057,357

METHOD OF DRAWING GLASS SHEETS

Walter O. Amsler, Toledo, Ohio, assignor to Simplex Engineering Company, Washington, Pa., a corporation of Delaware Application May 16, 1934, Serial No. 725,905

2 Claims. (Cl. 49—83.1)

This invention relates generally to the forming of glass sheets or the like and has particular reference to an improved method of drawing glass sheets.

One of the primary objects of this invention is to provide a method which will insure that the glass will be drawn in a straight line from a point where the glass is still plastic to a point where the glass has been cooled sufficiently to permit its being handled.

A further object of this invention is to provide a method of the above mentioned character which may be practiced without marring the surfaces of the sheet of glass being drawn with the result that the drawn sheet need not be ground or polished.

Numerous other objects and advantages of this invention will become more apparent as the following description proceeds particularly when reference is had to the accompanying drawings wherein Fig. 1 is a semi-diagrammatic and fragmentary vertical sectional view through an apparatus constructed in accordance with the teachings of this invention;

Fig. 4 is a fragmentary sectional view similar to Fig. 1 showing the positions which certain parts of the apparatus assume during the cleaning of the apparatus;

Fig. 5 is a diagrammatic sectional view taken substantially on the line 5—5 of Fig. 2 and showing the method forming the subject matter of this invention; and Fig. 6 is a view taken substantially on the line 6—6 of Fig. 2 likewise showing diagrammatically the method forming the subject matter of this invention.

Figure 3:
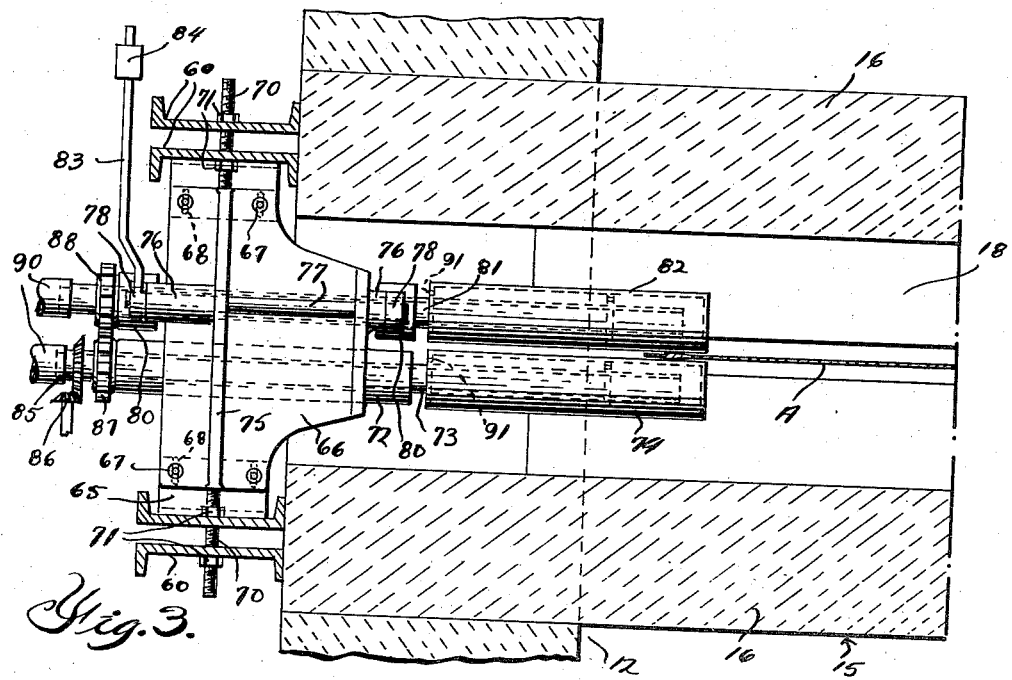
Fig. 3 is a horizontal sectional view taken substantially on the line 3—3 of Fig. 2.

In the drawing of glass sheets its has been the general practice to provide a pool or reservoir of molten glass, to drop a bait in this pool of glass and to then draw the bait upwardly, the bait carrying with it a sheet of glass in molten condition. Means have been provided for engaging the edges of the sheet adjacent the surface of the pool of molten glass to maintain or increase the width of the sheet drawn upwardly by the bait. The sheet of glass, thus increased in width, is drawn upwardly into an annealing apparatus which includes means for cooling the glass sheet and driven rollers which engage the surfaces of the glass sheet after these surfaces have partly solidified, these rollers acting to continue the upward drawing of the sheet to provide for the continuous drawing of a sheet of glass after the operation has been started by the bait.

This method has not proven wholly satisfactory, however, for the following reasons. The rollers in the annealing apparatus determine the actual line of draw of the glass sheet but these rollers do not contact the surfaces of the glass sheet until these surfaces are partly solidified with the result that if the sheet of glass was initially bowed or bent it could not be straightened by these rollers. Thus if the edge-engaging members were slightly out of alignment with the rollers in the annealing apparatus and in practical operation it was substantially impossible to accurately align these members with the rollers, then the sheet became bowed before it reached the rollers in the annealing apparatus with the result that it could not be subsequently ground and polished.

It is true that one modified practice has consisted in first drawing the sheet vertically and then while the sheet is still plastic, changing the line of draw to the horizontal by means of a roller which engages one surface of the sheet being drawn. This method has not proven wholly satisfactory, however, for the reason that this roller which changes the line of draw has, because it engages the surface of the sheet of glass while the glass is still plastic, marred the surface of the sheet of glass thus necessitating substantial grinding and polishing of this surface of the glass sheet.

The present invention contemplates the elimination of the above mentioned difficulties by providing a method which consists broadly of the following steps. First, the sheet is drawn from a suitable source of molten glass such, for example, as a pool of molten glass. Closely adjacent the source of glass to be drawn or the surface of the pool of molten glass, the edges of the glass sheet are engaged by knurled rollers which act to chill these edges and also to increase the width of the sheet of glass being drawn. Then the edges only of the sheet of glass are engaged by a guiding means which is accurately adjusted with reference to the rollers in the annealing apparatus with the result that this guiding means acts on the glass while the glass is plastic to accurately align the glass being drawn with the actual line of draw as determined by the rollers or drawing members in the annealing apparatus. It is a feature of this invention that the members which engage the edges of the glass sheet to stretch the latter are so arranged with reference to the guiding means that, during the initial drawing of the glass sheet, the latter is guided into positive engagement with the guiding means, so that the latter always accurately positions the glass sheet with reference to the actual line of draw.

More particularly, the present method consists in maintaining a pool of molten glass from which a sheet of glass may be drawn. As the sheet is drawn upwardly from the surface of the molten glass, its edges are engaged by knurled rollers which laterally stretch the glass sheet to a definite desired width. Disposed above these knurled rollers are guide rollers which also engage the edges of the glass sheet while the glass sheet is still plastic. The knurled rollers are offset with reference to the guide rollers so that the glass sheet is always drawn up against those guide rollers whose axes are fixedly mounted. These guide rollers are accurately located with reference to the line of draw of the glass sheet as determined by the rollers in the annealing apparatus with the result that the guide rollers insure that the sheet will be drawn in a straight line from the point where the sheet is plastic until it is cooled sufficiently to permit its being handled.

While various apparatuses might be provided for carrying out this method, one apparatus is, for the purposes of illustration, diagrammatically illustrated in the accompanying drawings. Referring then particularly to these drawings wherein like reference characters designate corresponding parts throughout all views, the numeral 10 designates the end of a hearth of ordinary construction in which the glass to be drawn is melted. This hearth communicates, by means of an opening 11, with a reservoir or tunnel 12 which receives the glass which is to be drawn into sheets or plates.

Disposed in the reservoir 12 is a draw well designated generally by the reference character 15, this draw well being of substantially standard construction. As illustrated, the draw well comprises vertical refractory walls 16 which rest on the top 17 of the glass tank or reservoir. The walls 16 define a chamber 18 which opens upwardly to provide access to the surface of the molten glass in the reservoir or tank 17. The opening through the upper end of the chamber 18 is preferably partly restricted by the inwardly extending flanges 19 formed on the walls 16.

Disposed above the chamber 18 and either supported on the walls 16 or suspended in any desired manner from a supporting structure (not shown) is an annealing apparatus designated generally by the reference character 25. This annealing apparatus is likewise of substantially usual construction in that it comprises walls 26 so shaped as to provide a vertical casing or chimney. Rolls 27 are arranged in pairs in this casing and these rolls are suitably driven so as to draw upwardly the sheet or plate of glass that is being drawn. In accordance with the usual practice, one roll of each pair is rotatably mounted on a fixed axis while the other roll of each pair is rotatably mounted on an axle carried by the end of a bell crank lever 28, the other arm of which carries a weight 29. The bell crank levers are suitably pivotally mounted as at 30 so that the movable rollers are yieldably urged toward the rollers whose axes are fixed with the result that the surfaces of the glass sheet are firmly gripped. The rollers whose axes are fixed are driven in any desired manner (not shown) and these rollers carry gears 31 which engage like gears on the other rollers 27 to drive the latter as will be apparent. The casing of the insulating apparatus is provided with suitable clean out doors 32 and is also provided with suitable means (not shown) for effecting a cooling of the glass sheet as it moves upwardly between the pairs of rollers 27.

Disposed immediately above the surface of the glass in the chamber 18 are knurled rollers 35 adapted to engage the edges of the sheet to be drawn to stretch the same to the width desired. These rollers are carried on shafts 36 suitably journalled in bearings 37 which bearings are carried by removable supports 38 so that the knurled rollers may, when desired, be removed from their operative position. The shafts 36 are driven in any desired manner as, for example, by providing one shaft of each pair with a beveled pinion 39 adapted to be engaged by a drive pinion 40, the driven shaft 36 carrying a gear 41 adapted to engage a similar gear mounted on the other shaft of its respective pair. The knurled rollers of each pair may be urged toward each other by any suitable means (not shown) in accordance with the usual practice.

For the purpose of cooling the knurled rollers, each shaft 36 may be hollow and disposed centrally of each shaft is a pipe 42 which extends to the outer end of its respective shaft 36 to discharge a cooling fluid such as water adjacent its outer end. Water is supplied to the tube 42 by a suitable gland 43 and a supply pipe 44 while the water after it has flowed backwardly through the tube 36 may be discharged from the latter through a gland 45 and a discharge 46.

Adjacent the rollers 35, but above the same, are coolers 50 which extend entirely across the draw well. Each cooler is supported in position by suitable racks 51 which rest on the upper surfaces 17 of the glass tank and which engage cooling fluid supply or discharge pipes 52, which project from opposite ends of the cooler. Flexible hoses 53 are connected to the supply and discharge pipes for supplying cooling fluid to the coolers and receiving the discharged cooling fluid from these coolers, it being understood that cooling fluid is supplied to one end of each cooler and is discharged from the other end thereof, although only one end of the coolers is shown in the drawings.

The structure as thus far described is substantially standard and forms no part of the present invention, which, as brought out before, is directed more particularly to a means for accurately aligning the sheet being drawn with the line of draw as determined by the fixed axes of the pairs of rollers 27. It has been found that it is substantially impossible to so align the knurled rollers 35 with the rollers 27 and to position the rollers 35 sufficiently close to the rollers 27 as to prevent bending or bowing of the sheet of glass being drawn between the knurls and the lowermost rollers 27. To eliminate this bending or bowing therefore, the present invention provides guiding means disposed between the knurled rollers 35 and the lowermost rollers 27, this guiding means being engageable only with the edges of the glass sheet being drawn and being adjustable so that it may be accurately positioned with reference to the line of draw as determined by the pairs of rollers 27.

Figure 2:
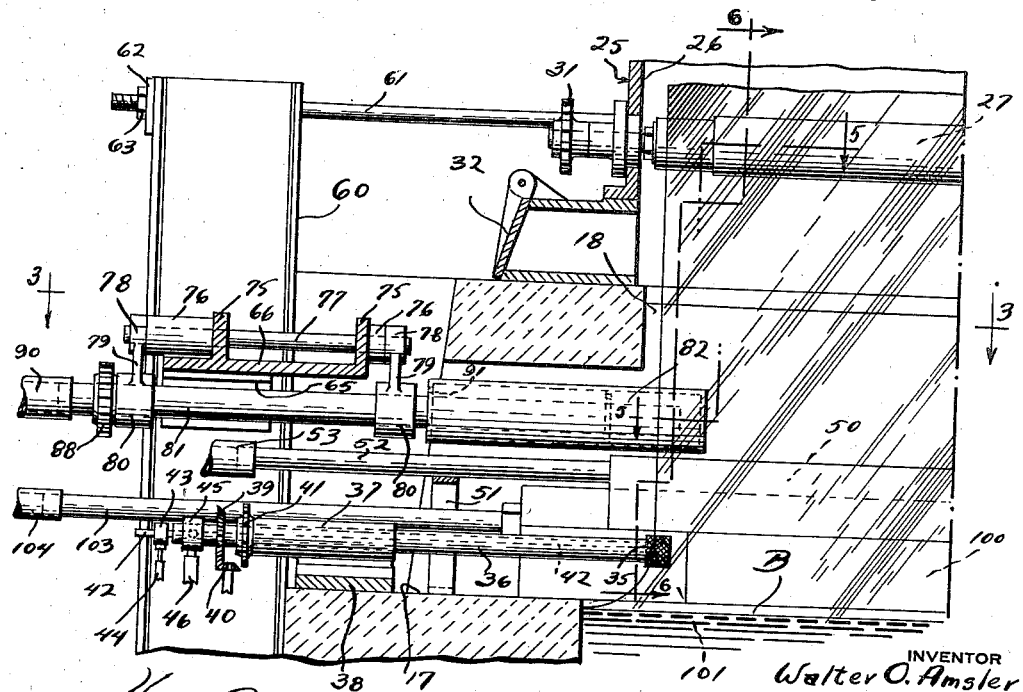
Fig. 2 is a vertical sectional view taken substantially on the line 2—2 of Fig. 1.

Referring then to Figs. 1 to 3 inclusive, of the drawings wherein this guiding means is shown in detail, it will be noted that secured to the end of each wall 16 and extending vertically thereof, are a pair of U-beams 60. These beams constitute a part of the structural frame work of the machine and the beams of one side are preferably secured at their upper and lower ends to the beams on the other side of the draw well by rods 61 which pass through plates 62 engaging the outer edges of the beams. Nuts 63 threaded on the tie rods 61 provide for proper adjustment of the tie rods to hold the beams in proper position.

Secured to the opposed beams 60 are angle plates 65, and on the horizontal portions of these angle plates there rests a supporting plate 66. The ends of the supporting plate 66 carry bolts 67 which pass through slots 68 formed in the horizontal portions of the angle plates 65 with the result that when the nuts 69 threaded on these bolts are loosened the plate 66 may be adjusted laterally between the opposed beams to any desired position.

To provide for a regulated and fine adjustment of the supporting plates 66, screws 70 are provided, these screws passing through the beams 60 and abutting the adjacent edges of the plate 66. The screws are locked in adjusted position by a pair of lock nuts 71.

It will be noted from Fig. 2 of the drawings that the plate 66 is disposed slightly above the coolers 50 and thus between the knurls 35 and the lowermost rollers 27. The plate 66 carries depending webs 72 which constitute bearings for the axle 73 of the roller 74. Thus while this roller may rotate, its axis is accurately fixed with reference to the plate 66. The upper surface of plate 66 is provided with upstanding webs 75, these webs being extended to form bearings 76 for a shaft 77. Secured to this shaft are sleeves 78 and depending from these sleeves are arms 79 which carry bearings 80 for a second shaft 81 on which a roller 82 is mounted. Secured to one of the sleeves 78 and projecting laterally therefrom is an arm 83, which carries a weight 84 with the result that the roller 82 is constantly urged toward the roller 74 as will be readily apparent.

For driving the rollers 74 and 82, there may be fixed to shaft 73 a beveled pinion 85 which is engaged by a pinion 86 which may be driven from any suitable source of power (not shown). The roller 82 is driven from the roller 74 by a gear 87 fixed to shaft 73, this gear engaging a gear 88 fixed to the shaft 81. The teeth of the gears 87 and 88 are preferably large so that the gears will engage even though the rollers 74 and 82 move relative to each other.

The rollers 74 and 82 are preferably cooled by a fluid, such for example, as air, and for this purpose the shafts 73 and 81 are hollow and have affixed thereto supply conduits 90 which are connected to any suitable source of cooling fluid (not shown). The shafts extend to substantially the ends of the rollers 74 and 82, and these rollers being hollow, the air discharged therein passes backwardly and is discharged through the openings 91 formed in the outer ends of the hollow rollers. It is to be noted that the rollers 74 and 82 do not extend entirely across the draw well but extend inwardly only a distance sufficient to engage the edges of the sheet A of glass being drawn.

While the rollers 74 and 82, at one side only of the draw well are shown and described, it will be understood that similar rollers are arranged at the other side of the draw well for engaging the opposite edge of the drawn sheet A. It is to be noted further that by releasing the bolts 67, the entire assembly just described, including the rollers 74 and 82, may be removed from the draw well.

As previously mentioned, the invention further contemplates the provision of means for preventing cooling of the surface of the glass in the pool from which the glass sheet is drawn. The structure for accomplishing this is illustrated in Figs. 1 and 2 of the drawings, in which figures the level of the glass in the reservoir is designated by the reference character B.

Disposed immediately above the level of the glass and supported at their ends on the top 17 of the tank or reservoir, are shield blocks 100, there being two of these blocks provided, the blocks approaching each other but being spaced apart a distance sufficient to permit the passage between the same of the glass sheet being drawn. The blocks are cut away at their ends as illustrated in Fig. 1 by the dotted lines and in Fig. 2 by the reference character 101, to provide clearance for the knurls 35, the blocks extending wholly across the draw well as will be readily apparent.

These blocks are of vitreous material and to prevent their falling into the pool of glass in the event of their breakage, tubular reenforcing members 103 are provided, these members, passing longitudinally through the blocks as illustrated in Figs. 1 and 2. To prevent burning out of these tubes, they may be supplied with cooling fluid from conduits 104, it being understood that the cooling fluid is supplied to the tubes at one side of the draw well and is discharged from the tubes at the other side thereof in a suitable manner (not shown).

The shield blocks 100 approaching each other as they do, protect the surface of the molten glass from the temperature of the chamber 18 and from the temperature of the annealing apparatus 26 with the result that the molten glass is maintained at an even temperature and distortion of the glass sheet being drawn is eliminated.

It might be noted that the shield blocks 100 serve a further purpose particularly when the lower portion of the draw well is heated for cleaning out the hardened glass prior to starting of the operation of the apparatus. This use of the shield blocks is diagrammatically illustrated in Fig. 4 of the drawings, from which figure it will be noted that the shield blocks have been raised to an elevated position immediately below the flanges 19 of the walls 16.

While any convenient means may be provided for raising these shield blocks, it is obvious that they may be raised by manually grasping the projecting ends of the conduits 103 and raising these conduits until the shield blocks are in the position desired. For holding the shield blocks in their elevated position, a block 110 may be provided at each side of the draw well, each block resting on the top 17 of the tank, and the ends of the shield blocks resting on the upper edge of these blocks. These blocks constitute closures for the ends of chamber 18 during the cleaning operation. A tapered burner opening 111 may be provided in each block 110 so that suitable burners may be projected into the chamber 18 below the shield blocks, when desired. For closing the sides of the chamber 18 between the shield blocks 100, there may be provided at each end of the shield blocks a refractory plate 112 which may rest on the upper edge of the adjacent block, 110, the latter being suitably widened for this purpose. The space between the shield blocks adjacent the upper edges of the same may be closed by suitable blocks 115, which rest on shoulders 116 formed on the shield blocks by virtue of the shape thereof. From the above it is believed that the structure of the apparatus will be clearly apparent.

To briefly review the method particularly as carried out on the apparatus disclosed, attention is directed first to Figs. 1 and 6 from which it will be noted that the knurls 35 are offset laterally with respect to the line of draw of the glass as determined by the guide rollers 74. Further, this offset is such that the glass is drawn from the source at an angle to the vertical, and this angle is so related to the main line of draw of the glass sheet that the edges of the sheet being drawn are constantly held against the rollers 74, the axes of these rollers being fixed as previously pointed out. Obviously, the opposite sides of the edges of the glass sheet will be engaged by the rollers 82, which rollers however, may adjust themselves to the thickness of the sheet of glass being drawn.

By properly adjusting the plates 66, the rollers 74 may be accurately located with reference to the rollers 27 which are mounted on fixed axes and thus the rollers 74 may be accurately adjusted with reference to the line of draw as determined by the pairs of rollers 27. Thus the glass sheet being drawn, while still in a plastic state, is accurately aligned with the ultimate line of draw and the aligning means is so spaced from the source of glass to be drawn and from the knurls that there is no tendency for the glass sheet to bow or bend between the guiding means and the first pair of rollers 27.

In practicing the method, a suitable bait is in accordance with the usual practice, dipped into the pool of molten glass and then drawn upwardly between the knurls, the guide rollers and the rollers 27. These rollers, being driven as they are after the sheet is started, continue to draw glass in the form of a sheet from the pool of glass as will be readily apparent. Almost immediately after the glass being drawn leaves the surface B of the pool of glass, the edges of the glass sheet are engaged by the knurls 35 which act to widen the sheet to the width desired. It might be noted that each edge of the glass sheet is thickened adjacent its engagement with the knurls as illustrated in Figs. 3 and 5 of the drawing.

Before the sheet of glass being drawn has an opportunity to harden, or in other words, while it is still plastic, its thickened portions are engaged by the rollers 74 and 82, the offsetting of the knurls 35 insuring that the thickened edges of the glass sheet are positively held in engagement with the rollers 74. These rollers 74 may be accurately adjusted with respect to the fixed rollers 27 with the result that while the sheet is still plastic it is accurately aligned with the desired or ultimate line of draw. Thus there is no danger whatever of the sheet bowing or bending and thus becoming distorted prior to its engagement by the rollers 27.

It might be noted that in actual use the rollers 82 might, if desired, be eliminated, the operation of the method depending more particularly on the rollers 74 which are accurately adjusted to guide the sheet being drawn into engagement with the rollers 27.

It might also be noted that the rollers 27 may be covered with asbestos or the like in accordance with the usual practice, while the rollers 74 and 82 are preferably formed of steel or some like material.

Thus it will be apparent that the invention provides both a method and an apparatus by which glass in sheet form may be continuously drawn from a suitable source of glass, the glass while plastic being accurately guided into alignment with the desired line of draw so that the glass is drawn in a straight line from a point where the glass is plastic until the glass is cooled sufficiently to permit its being handled.

Whenever it is desired or becomes necessary, to clean the lower portion of the draw well, the knurls and the coolers 50 are removed from the draw well in any desired manner. Further, the rollers 82 and 74 are removed by disconnecting the plate 66 from the angle plates 65, the guiding means thus being removable as a unit from the draw well. Since rubber hoses or other flexible conduits are provided for supplying cooling fluid to and receiving the same from the knurls, coolers and guide rollers, it will be apparent that the connections between these elements and the source of cooling fluid may be disconnected when desired, to thus facilitate removal of these elements.

After these elements are removed, the shields 100, which in their normal position prevent surface cooling of the pool of glass from which the glass is drawn, are elevated to the position shown in Fig. 4, after which the ends of the chamber 18 are closed in the manner illustrated, as is also the upper opening between the shields. With the lower portion of the draw well thus sealed, suitable burners may be inserted into the draw well through the openings 111 to melt any glass retained therein and to thus thoroughly clean the draw well before the next drawing operation is started.

It is to be understood that the glass may be drawn directly from the surface of the pool of molten glass in the manner illustrated or that, if desired, a float or an underbridge may be utilized at the point of draw as indicated in dotted lines in Fig. 1 of the drawings.

From the above it will be apparent that the invention provides a method of drawing glass sheets in such a maner that it will be unnecessary to grind or polish the glass sheets after they are drawn. The guiding means is so arranged that it engages the glass while the same is still plastic and aligns it with the line of draw through the annealing apparatus with the result that the glass is not bowed or bent and thus may, if desired, be polished or ground without being broken. This polishing or grinding is however, generally unnecessary for the reason that the guiding means only engage the thickened edge portions of the glass sheet being drawn and does not engage the surfaces of the glass sheet, these surfaces being only engaged by the rollers in the annealing apparatus after these surfaces of the glass have become partly solidified.

While the invention has been described with some detail, it is to be understood that the description is for the purposes of illustration only and is not definitive of the limits of the inventive idea. The right is reserved to make such changes in the details of construction, the steps of the method and the arrangement of parts as will fall within the purview of the attached claims.

What I claim as my invention is:

1. The method of drawing sheet glass from a source of glass to be drawn which consists in drawing the sheet of glass from said source and laterally stretching the same to the desired width during the drawing thereof, cooling and guiding the edges only of said widened sheet of glass while the sheet is still plastic to align the sheet of glass with a definite line of draw and to form hardened edge portions on the sheet, maintaining the surfaces of the sheet of glass between the cooled edges thereof out of contact with guiding or drawing means until the said surfaces have become set, and then drawing the sheet of glass along said definite line of draw.

2. The method of drawing sheet glass from a source of glass to be drawn which consists in drawing the sheet of glass from said source at an angle to a desired line of draw and laterally stretching the same to the desired width during the drawing thereof, cooling and guiding the edges only of said widened sheet of glass while the sheet is still plastic to align the sheet of glass with a definite line of draw and to form hardened edge portions on the sheet, maintaining the surfaces of the sheet of glass between the cooled edges thereof out of contact with guiding or drawing means until the said surfaces have become set, and then drawing the sheet of glass along said definite line of draw.

WALTER O. AMSLER.